United States Patent [19]

Kancigor

[11] Patent Number: 5,761,550
[45] Date of Patent: Jun. 2, 1998

[54] TELESCOPING FLASH UNIT FOR A CAMERA

[76] Inventor: Barry Kancigor, 1949 Sunset La., Fullerton, Calif. 92833

[21] Appl. No.: 802,749

[22] Filed: Feb. 20, 1997

[51] Int. Cl.$^6$ .................................................. G03B 15/03
[52] U.S. Cl. ............................ 396/176; 362/8; 396/422
[58] Field of Search .................................... 396/177, 175, 396/176, 155, 180, 422, 205; 362/8, 3; 348/370, 371

[56] References Cited

U.S. PATENT DOCUMENTS

| | | | |
|---|---|---|---|
| 3,187,170 | 6/1965 | Kille | 362/8 |
| 3,289,563 | 12/1966 | Kent | 396/422 |
| 3,893,145 | 7/1975 | King | 396/422 X |
| 4,045,808 | 8/1977 | King | 354/126 |
| 4,091,402 | 5/1978 | Siegel | 396/422 X |
| 4,425,531 | 1/1984 | Holmes | 362/8 X |
| 4,515,453 | 5/1985 | Wakabayashi et al. | 354/149.1 |
| 4,855,771 | 8/1989 | Alligood et al. | 354/149.11 |
| 4,893,139 | 1/1990 | Alligood et al. | 354/149.1 |
| 5,337,105 | 8/1994 | Vaynshteyn | 354/149.11 |
| 5,515,126 | 5/1996 | Baxter et al. | 354/149.11 |

*Primary Examiner*—W. B. Perkey
*Attorney, Agent, or Firm*—Lyon & Lyon LLP

[57] ABSTRACT

A telescoping flash unit for a camera helps substantially reduce "red-eye" by extending the flash head to a position far enough away from the objective lens such that the angle of incidence from the flash unit to the subject's eyes is too great for the light to be reflected from the subject's eyes directly back into the objective lens. The compact nature of the camera is maintained when the flash unit is not being used, by either retracting the flash unit back into the body of the camera, or detaching it from the camera. The flash unit is easily separable from the camera body or the external bracket should the flash unit need to be repaired or replaced.

28 Claims, 3 Drawing Sheets

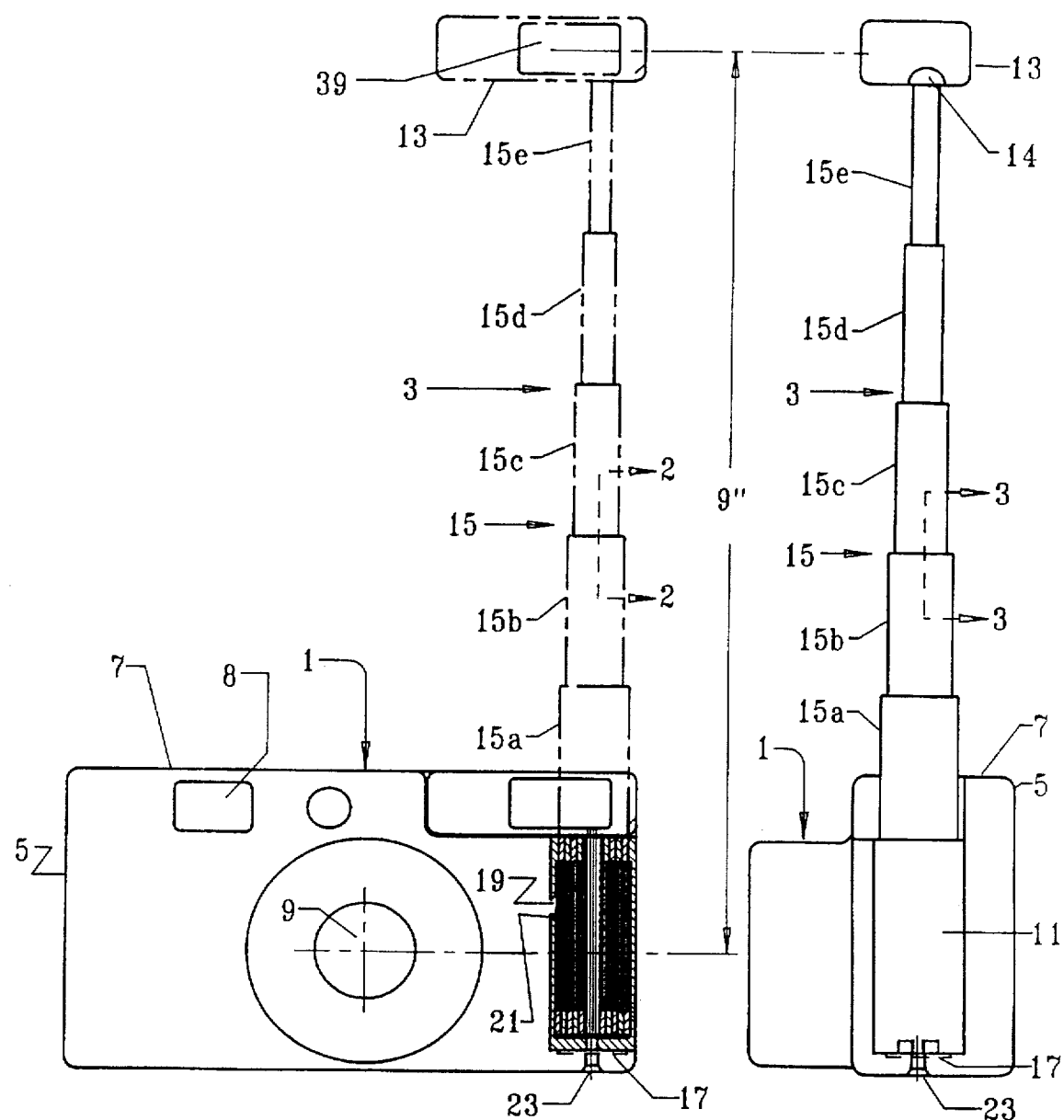

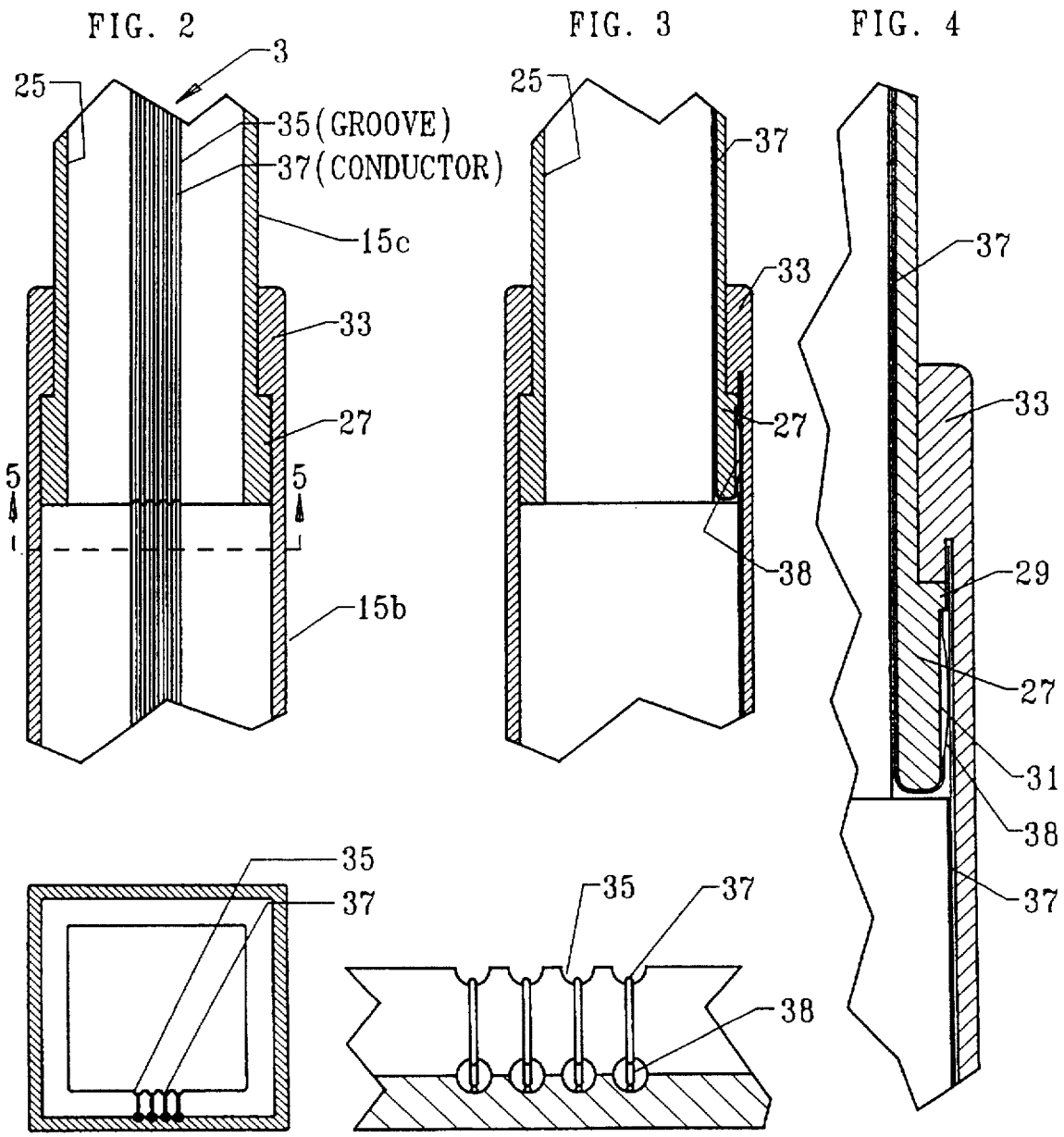

TELESCOPING FLASH UNIT FOR A CAMERA

FIELD OF THE INVENTION

The present invention relates to photography, and more specifically to flash photography.

BACKGROUND OF THE INVENTION

Cameras with built-in flash units or flash accessories have been available for quite some time. However, due to the desire to keep the cameras compact, the distance from the flash unit to the objective lens is typically very short. As a consequence, the axis from the flash unit to the subject being photographed is substantially parallel to the objective axis (the axis from the objective lens to the subject being photographed). Thus, when the flash illuminates, if the subject looks directly into the objective lens, and therefore substantially directly into the flashed light, the light hits the subject's eyes straight on. This causes the subject's retinas to reflect red light, straight back at the objective lens, resulting in red pupils on a final developed color print. This is known as "red-eye."

Various methods have been developed in an attempt to eliminate or substantially reduce "red-eye." For example, some cameras have flash units which flip up from, pop up from, or are pivotally attached to the camera body, in an attempt to increase the angle of incidence from the flash unit to the subject's eyes such that the angle is too great for the light to be reflected from the subject's eyes directly back into the objective lens. Other cameras have flash units which emit a rapid series of pre-photograph flashes to desensitize the subject's pupils, in an attempt to minimize the amount of light reflected from the subject's retinas when the actual flash occurs for the photo. Another method of reducing "red-eye" is to diffuse the light from the flash so that much of the light does not hit the subject's eyes straight on.

SUMMARY OF THE INVENTION

An object of this invention is to provide a device for eliminating or substantially reducing the "red-eye" effect in flash photography, while not greatly impacting the compact nature of the camera.

A further object of this invention is to provide means for easily separating the device from the camera should the device need to be repaired or replaced.

In a preferred embodiment of this invention, this is accomplished by a telescoping flash unit. "Red-eye" is reduced by extending the telescoping flash unit to a position far enough away from the objective lens such that the angle of incidence from the flash unit to the subject's eyes is too great for the light to be reflected from the subject's eyes directly back into the objective lens. The compact nature of the camera is maintained when the flash unit is not being used, by either retracting the flash unit back into the body of the camera, or detaching it from the camera. The flash unit is attached to the bottom of the camera by a screw, and can therefore be easily separated from the camera if needed.

Other advantages of this invention will become apparent from the detailed description of the preferred embodiments which follow.

BRIEF DESCRIPTION OF THE DRAWINGS

FIG. 1a is a front elevation view of a camera with one of the preferred embodiments of the telescoping flash unit in its retracted position, along with a phantom sketch of the telescoping flash unit in its extended position.

FIG. 1b is a side elevation view of the camera and telescoping flash unit in FIG. 1a.

FIG. 2 is a vertical cross section along a line 2—2 of FIG. 1a, of a portion of the telescoping flash unit showing where two segments interlock, and showing longitudinal grooves and electrical conductors in the inside walls of each segment.

FIG. 3 is a vertical cross section of a portion of the telescoping flash unit showing where two segments interlock, along line 3—3 of FIG. 1b, further showing electrical conductors positioned in the grooves.

FIG. 4 is an enlarged view of the portion of FIG. 3 which shows the electrical conductors.

FIG. 5 is a horizontal cross section along line 5—5 of FIG. 2, showing electrical conductors in an end view and demonstrating how the electrical contact is maintained.

FIG. 6 is an enlarged view of a portion of FIG. 5.

DETAILED DESCRIPTION OF THE PREFERRED EMBODIMENT

Figure 7:
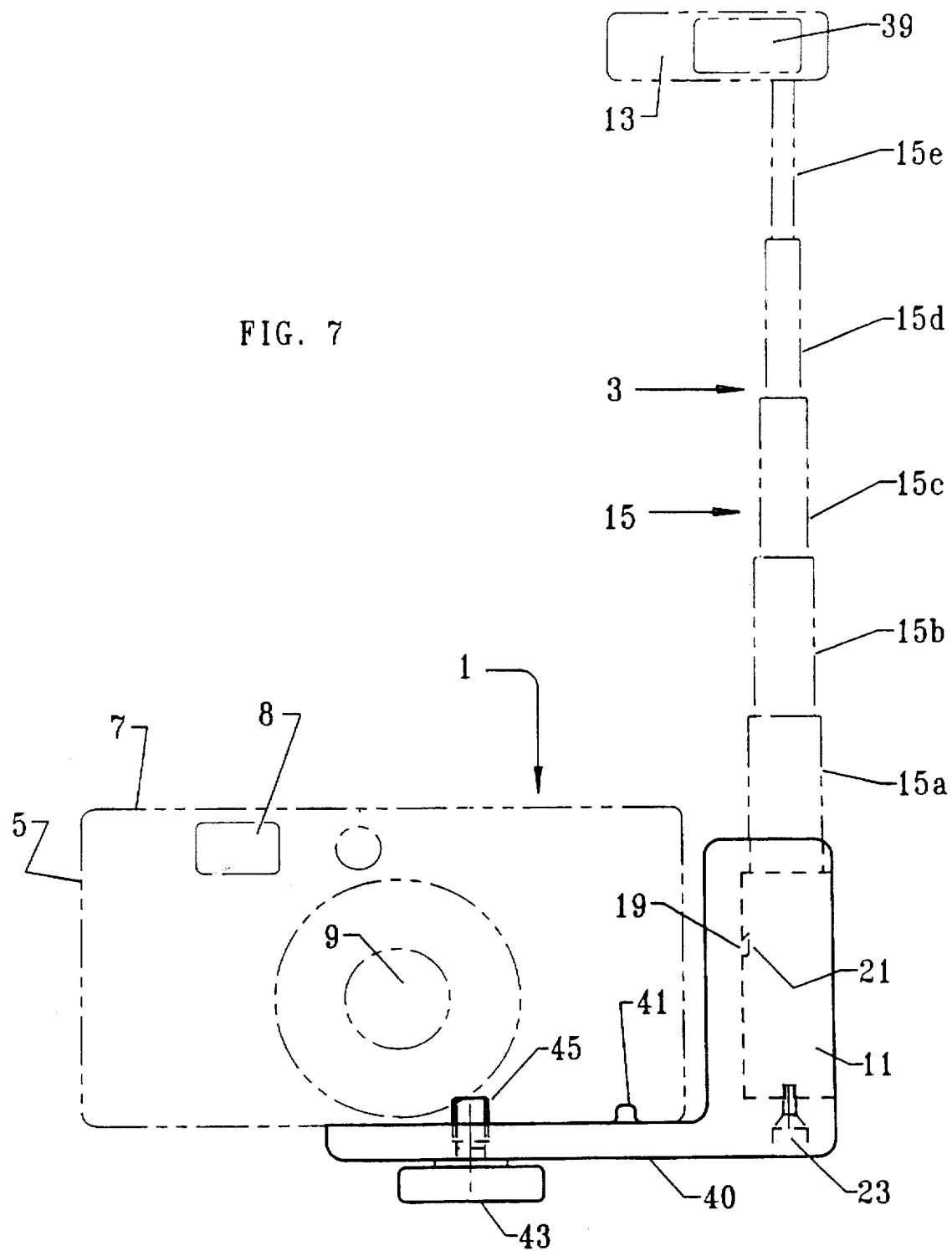
FIG. 7 is a camera, with an alternative embodiment of the telescoping flash unit shown in phantom in its extended position.

A preferred embodiment of the invention is disclosed as being for use with a compact camera. Since such cameras are well-known, the following detailed description is directed to the camera elements forming part of or directly cooperating with the preferred embodiments of the present invention. It is to be understood, however, that camera and flash elements not specifically shown or described may take various forms known to persons of ordinary skill in the art. For example, the invention may function in cooperation with either conventional or digital cameras.

The drawings illustrate the preferred embodiments of the invention: a telescoping flash unit for a camera. FIG. 1a shows a camera 1 and a telescoping flash unit 3. The camera 1 has a camera body 5 with an upper surface 7, a view-finder window 8, and an objective lens 9. In FIG. 1a and FIG. 1b, the flash unit 3 comprises a base 11 for securing the flash unit 3 to the camera body 5, a flash head 13 for housing conventional flash components (not shown), and a segmented body 15 for telescoping the flash head 13 upwardly away from the objective lens 9.

The camera body 5 has a recess 17 for receiving the base 11 of the flash unit 3, and an upwardly angled catch 19 protruding from the camera body 5 into the recess 17 for catching and engaging a corresponding indentation 21 in the base 11 of the flash unit 3 to thereby attach and provide stability to the flash unit 3. The base 11 of the flash unit 3 is further secured in place by a screw 23 which pulls the base 11 down and anchors it onto the catch 19. This method of attachment eases the task of separating the flash unit 3 from the camera body 5, should the flash unit 3 need to be repaired or replaced. Electrical conductors (not shown) within the base 11 provide contact with electrical contacts (not shown) in the camera body 5, allowing a conventional flash-initiation circuit (not shown) to trigger a flash.

When the flash unit 3 is in a retracted position, the flash head 13 is substantially flush with the upper surface 7 of the camera body 5 for ease of storage. When the flash unit 3 is in an extended position, the flash head 13 is at a position far enough away from the objective lens 9 such that the angle of incidence of light from the flash head 13 to the subject's eyes is too great for the light to be reflected from the subject's eyes directly back into the objective lens 9, to thereby reduce or eliminate "red-eye." The fully extended position, as seen in FIG. 1a and FIG. 1b, places the flash head 13 preferably eight to nine inches away from the objective lens 9. The flash head 13 has a finger indentation 14 (FIG. 1b) to ease the task of extending the flash unit 3.

The segmented body 15 comprises a plurality of equally long, substantially hollow segments 15a–15e with inner walls 25 (FIG. 2 and FIG. 3). The horizontal cross-sections of the segments 15a–15e are non-circular, and preferably rectangular, to prevent them from rotating with respect to one another. Each segment may also contain detents (not shown) to indicate and maintain full extension. The first segment 15a is the widest and also the closest to the camera body 5 when the flash unit 3 is fully extended. Each successive segment may extend farther away from the camera 1 than the previous segment, and is narrower than the previous segment such that when the flash unit 3 is in the retracted position, each successive segment is fully contained within the previous segment. The last segment 15e is the narrowest, and supports the flash head 13 which is connected thereto by any conventional means.

Turning to FIG. 2, FIG. 3, and FIG. 4, which are representative of any two consecutive segments 15b and 15c, each segment 15a–15e has an outwardly extending bottom 27 with an upper rim 29 (FIG. 4), and an outer wall 31. The base 11, and each segment other than the last segment 15e, has an inwardly extending top 33. Each top 33 catches the bottom 27 of the subsequent segment such that the subsequent segment cannot be over-extended and thereby detached from the flash unit 3. The last segment 15e supports the flash head 13 as previously described, and therefore does not require an inwardly extending top.

Each segment 15a–15e also has a plurality of longitudinal grooves 35 in its inner wall 25, for mounting and securing electrical conductors 37 from one end of the segment to the other end. The grooves 35 in each segment are aligned with the grooves 35 in each other segment such that when the flash unit 3 is in any position ranging from a fully retracted position to a fully extended position, there is always an electrical connection from one segment to the next within each corresponding groove 35. Thus, the flash unit 3 is operable in any position ranging from a fully retracted position to a fully extended position. The rectangular shape of the segments prevents the segments from rotating with respect to one another, and therefore helps to maintain the grooves 35 in alignment. Each electrical conductor 37 from the first segment 15a connects to corresponding conductors in the base 11, which in turn connects to a corresponding contact (not shown) in the camera body 5. Each electrical conductor 37 from the last segment 15e connects to a corresponding contact (not shown) in the flash head 13. Hence, conductors electrically connect from the camera body 5 to the flash head 13, to supply power and controls from the camera body 5 or the base 11 to the flash head 13.

For each segment 15a–15e the conductors 37 are bent in a U-shape at the bottom 27 of the segment as seen in FIG. 4, such that the conductor extends from the inner wall 25 of the segment back up the outer wall 31 of the bottom 27 of the segment. Along the outer wall 31, the conductor 37 has an arced portion 38 which arcs toward the previous segment (or in the case of the first segment 15a toward the base 11) to provide a good electrical contact and frictional support for the segment to prevent it from collapsing back into the previous segment. The arced portion 38 of the conductor 37 terminates at the upper rim 29 of the bottom 27 of the segment, and allows for a firm contact with the conductor from the previous segment, which extends up past the bottom 27 of the segment and into the top 33 of the previous segment.

As previously described, the last segment 15e does not have an inwardly extending top, because it is secured to and electrically connected to a flash circuit (not shown) in the flash head 13. Therefore, the conductors 37 within the last segment 15e terminate at the flash head 13 instead of extending into an inwardly extending top.

The grooves 35 are shown adjacent to one another within a particular segment, as seen in FIG. 2, but this is not required. For example, the grooves 35 may each be positioned on separate inner walls of a particular segment, allowing for more conductors 37 if needed, and potentially a smaller segment cross section.

The flash head 13 preferably contains the usual flash circuitry (not shown) for charging a main capacitor and a trigger capacitor, and for firing a flash tube 39 therein. The conductors 37 provide power (e.g. several volts DC) to the flash circuitry and provide a trigger from the synchronizing contacts of the camera shutter for firing the flash. This requires three conductors, but four (or more) can be provided as shown, for other purposes such as providing a "sufficient flash received" signal for display in the viewfinder 8 of the camera.

The flash unit 3 is preferably made of plastic, but may be made of a stronger material such as metal. However, the electrical conductors 37 within metal segments 15a–15e must obviously be insulated therefrom.

In an alternative embodiment as shown in FIG. 7, the flash unit 3 is separate and detachable from the camera body 5. The flash unit 3 is received into and secured in an external bracket 40, and electrically connected thereto, in a manner similar to how the flash unit 3 in the embodiment previously described is connected to the camera body 5. The bracket 40 is positioned along the camera body 5 such that suitable electrical contacts in the bracket 40 match up with and engage contacts 41 in the camera body 5 at a predetermined location. The bracket 40 is secured to the camera body 5 by a locking bolt 43 which screws into a tripod mounting hole 45 within the camera body 5. In this embodiment, the camera circuitry may be able to recognize when the flash unit 3 is attached to the camera body 5, and can therefore determine whether to utilize a built in flash (not shown) or the flash of the flash unit 3.

While the preferred embodiments are illustrated in the drawings and have just been described herein, it will be apparent to those skilled in the art that many modifications can be made to the preferred embodiments without departing from the inventive concepts described. Accordingly, the invention is not to be restricted except by the claims which follow.

What is claimed is:

1. A camera having a telescoping flash unit, the telescoping flash unit comprising:

a base arranged in the camera, the base having an inner wall;

a segmented body comprising a plurality of segments including a first segment and a last segment, each segment having an inner wall, the segmented body being housed within the base and extendable therefrom in a telescope-like manner such that in a fully extended position the last segment is farther away from the camera than the first segment;

a flash head attached to the last segment and shaped such that when the telescoping flash unit is not extended, the flash head is substantially flush with the upper surface of the camera; and means for supplying electrical power and controls to the flash head from the camera such that the flash head can emit a flash when a photograph is taken.

2. The camera as in claim 1 wherein the base of the flash unit is housed in a recess of the camera, and the camera and the base have a cooperating indentation and an upwardly angled catch within the recess to couple together the camera and the base.

3. The camera as in claim 2 wherein each segment has an outwardly extending bottom with an upper rim, and an outer wall, and wherein the base and each segment other than the last segment has an inwardly extending top, such that when the segmented body is fully extended each top catches the bottom of the subsequent segment to prevent the subsequent segment from being over-extended and thereby detached from the flash unit.

4. The camera as in claim 1 wherein the length of each segment is substantially the same, and wherein the distance from the objective lens of the camera to the flash head when the flash unit is fully extended is in the range of eight to nine inches.

5. The camera as in claim 1 wherein horizontal cross-sections of the segments are non-circular.

6. The camera as in claim 1 wherein the segmented body and the base are made of plastic.

7. The camera as in claim 1 wherein the inner wall of each segment and of the base has a plurality of longitudinal grooves aligned with the grooves in each other segment.

8. The camera as in claim 7 wherein the means for supplying electrical power and controls to the flash head comprises electrical conductors disposed within the grooves of each segment and of the base.

9. The camera as in claim 8 wherein the electrical conductors are U-shaped and are at the bottom of each segment such that said conductors extend from the inner wall of the segment back up the outer wall of the bottom of the segment where said conductors are arced toward a previous segment to provide frictional support for the segment and to prevent the segment from collapsing back into the previous segment, and wherein the arced portion of each of said conductors maintains electrical contact with the conductors from a previous segment.

10. The camera as in claim 2 wherein the base is secured in place by a fastener which pulls together the base and the catch.

11. The camera as in claim 8 wherein an electrical connection is maintained from one segment to the next within each corresponding groove, and the electrical conductors within the base connect to corresponding contacts in the camera body, and the electrical conductors within the last segment connect to corresponding contacts in the flash head, such that when the flash unit is in any position ranging from a fully retracted position to a fully extended position the camera body is electrically connected to the flash head.

12. A telescoping flash unit for a camera comprising:
an external bracket having a vertical section and an integral horizontal section, the horizontal section having means for detachably mounting the bracket to the bottom of the camera;
a base having its bottom detachably fastened to the lower portion of the vertical section by a securing means, the base having an inner wall;
a segmented body comprising a plurality of segments including a first segment and a last segment, each segment having an inner wall, the segmented body being housed within the base and extendable therefrom in a telescope-like manner such that in a fully extended position the last segment is farther away from the camera than the first segment;
a flash head attached to the last segment; and
means for supplying electrical power and controls to the flash unit from the camera such that the flash head can emit a flash when a photograph is taken.

13. The flash unit as in claim 12 wherein the means for detachably mounting the bracket onto the camera comprises a locking bolt which screws into a tripod mounting hole within the camera body.

14. The flash unit as in claim 12 wherein the bracket and the base have a cooperating indentation and an upwardly angled catch to couple together the bracket and the base.

15. The flash unit as in claim 14 wherein each segment has an outwardly extending bottom with an upper rim, and an outer wall, and wherein the base and each segment other than the last segment has an inwardly extending top, such that when the segmented body is fully extended each top catches the bottom of the subsequent segment to prevent the subsequent segment from being over-extended and thereby detached from the flash unit.

16. The flash unit as in claim 15 wherein the length of each segment is substantially the same, and wherein the distance from the objective lens of the camera to the flash head when the flash unit is fully extended is in the range of eight to nine inches.

17. The flash unit as in claim 12 wherein horizontal cross-sections of the segments are non-circular.

18. The flash unit as in claim 17 wherein horizontal cross-sections of the segments are rectangular-shaped.

19. The flash unit as in claim 12 wherein the segmented body and the base are made of plastic.

20. The flash unit as in claim 12 wherein the inner wall of each segment and of the base has a plurality of longitudinal grooves aligned with the grooves in each other segment.

21. The flash unit as in claim 20 wherein the means for supplying electrical power and controls to the flash unit comprises electrical contacts in the external bracket which match up with and engage contacts in the camera at a predetermined location, electrical conductors disposed within the grooves of each segment and of the base, and electrical conductors within the external bracket.

22. The flash unit as in claim 21 wherein the electrical conductors within the grooves in the segments are U-shaped and are at the bottom of each segment such that said conductors extend from the inner wall of the segment back up the outer wall of the bottom of the segment where said conductors are arced toward a previous segment to provide frictional support for the segment and to prevent the segment from collapsing back into the previous segment, and wherein the arced portion of each of said conductors maintains electrical contact with the conductors from a previous segment.

23. A telescoping flash unit for a camera comprising:
a base adapted to be received into the camera, the base having an inner wall;
a segmented body comprising a plurality of segments including a first segment and a last segment, each segment having an inner wall, the segmented body being housed within the base and extendable therefrom in a telescope-like manner such that in a fully extended position the last segment is farther away from the camera than the first segment;
a flash head attached to the last segment; and
means for supplying electrical power and controls to the flash head such that the flash head can emit a flash when a photograph is taken, said means comprising electrical conductors secured into longitudinal grooves in the inner wall of each segment and of the base wherein the grooves within one of the segments are aligned with the grooves in each other segment.

24. The flash unit as in claim 23 wherein the base of the flash unit is housed in a recess of the camera, and the camera and the base have a cooperating indentation and an upwardly angled catch within the recess to couple together the camera and the base.

25. The flash unit as in claim 24 wherein each segment has an outwardly extending bottom with an upper rim, and an outer wall, and wherein the base and each segment other than the last segment has an inwardly extending top, such that when the segmented body is fully extended each top catches the bottom of the subsequent segment to prevent the subsequent segment from being over-extended and thereby detached from the flash unit.

26. The flash unit as in claim 23 wherein horizontal cross-sections of the segments are non-circular.

27. The flash unit as in claim 23 wherein the means for supplying electrical power and controls to the flash head are located in the camera.

28. The flash unit as in claim 23 wherein the means for supplying electrical power and controls to the flash head are located in the base.

\* \* \* \* \*